(No Model.)
F. HEYL.
MILK STRAINER.
No. 325,801. Patented Sept. 8, 1885.
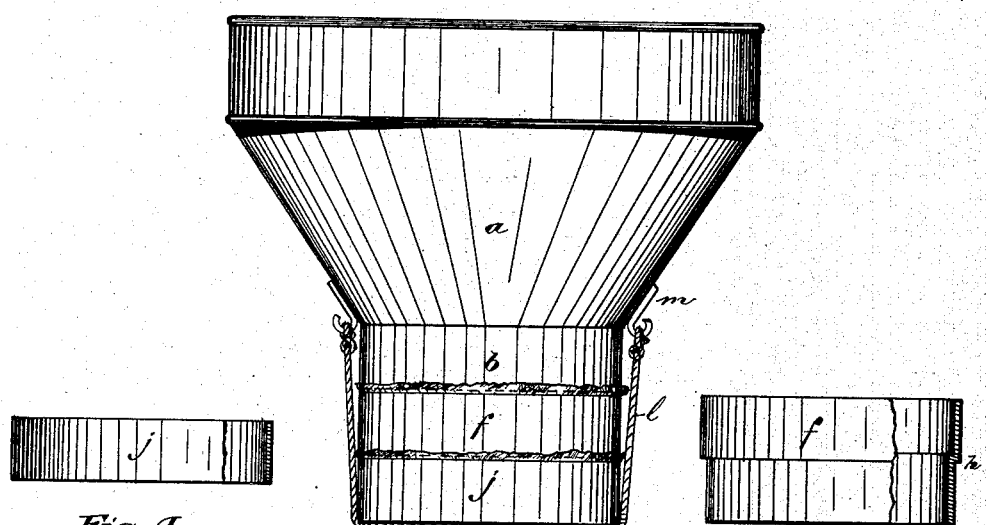
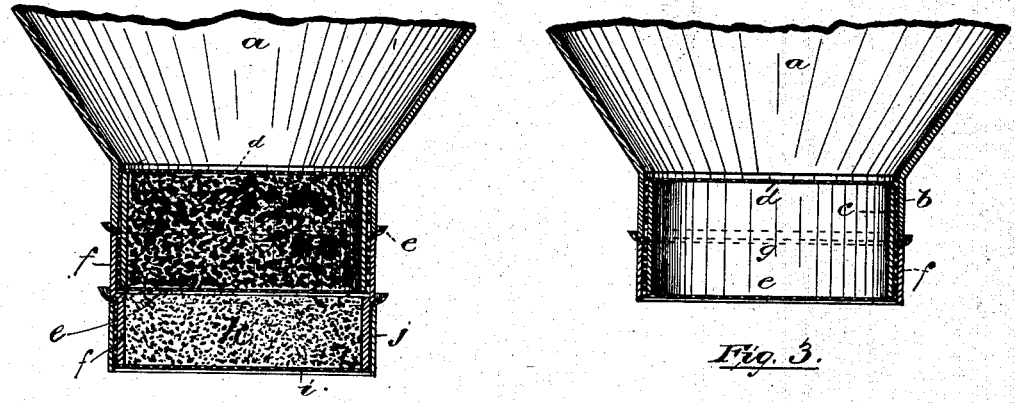
Attest:
F. F. Campbell
Oscar A. Michel.
Inventor:
Frederick Heyl,
by Drake & Co.,
attys.

UNITED STATES PATENT OFFICE

FREDERICK HEYL, OF NEWARK, NEW JERSEY.

MILK-STRAINER.

SPECIFICATION forming part of Letters Patent No. 325,801, dated September 8, 1885.

Application filed September 16, 1884. (No model.)

*To all whom it may concern:*

Be it known that I, FREDERICK HEYL, a citizen of the United States, residing at Newark, in the county of Essex and State of New Jersey, have invented certain new and useful Improvements in Milk-Strainers and Water-Filters Combined; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention consists in the combined milk-strainer and water-filter, in the peculiar construction of the same, and in the combinations and arrangements of parts thereof, substantially as and for the purposes set forth hereinafter, and finally embodied in the clauses of the claims.

Referring to the accompanying drawings, in which like letters indicate corresponding parts in each of the several figures, Figure 1 is a side elevation of the device; Fig. 2, a sectional view of the lower portion of the same showing said device particularly adapted for filtering water; Fig. 3, a sectional view of the device as arranged for straining milk; Fig. 4, a side view of a ring, partially in section, for holding a cloth diaphragm in position, and Fig. 5 is a side view of another ring, also partly in section, adapted more especially for use when the device is provided with two chambers for filtering materials.

In carrying out the invention I provide a funnel, $a$, with a wide or capacious body, to receive a considerable quantity of milk or water, and a comparatively narrow mouth, $b$, adapted to be inserted into the mouth of an ordinary milk-can. In and across said mouth I secure, by means of a removable inner ring, $c$, a filtering or straining diaphragm, $d$, of thin muslin or other similar fabric, the said diaphragm being first stretched across the said mouth and the ring pressed up in said mouth, so that the edges of the muslin are confined and tightly secured between the said mouth and ring, as shown. The said inner ring projects below the mouth of the funnel, and is in turn adapted to receive a second filtering or straining diaphragm, $e$, which in like manner is stretched across the said projecting inner ring and held by a second ring, $f$. For straining the milk the mesh of the first diaphragm is coarser than that of the second, so that the foam and coarser particles of matter are caught and the flow of the water or milk is impeded by the said first diaphragm, and the finer particles will not be forced through the second.

Thus constructed, the device is complete for straining milk. I may fill the chamber $g$ with filtering material—such as sand or charcoal—before securing the second diaphragm in place, and thus make a simple water-filter; but to attain the best results in filtering I prefer to have the ring $f$ extend below the second diaphragm, as in Fig. 2, a shoulder, $h$ (shown more clearly in Fig. 5) limiting the distance of upward movement of said ring, that a second chamber for the reception of filtering material may be formed. When said filtering material is placed therein, a third filtering fabric or diaphragm, $i$, Fig. 2, is secured thereover by a band or ring, $j$, as in the cases above referred to.

When the device is used for filtering water, the first chamber, $g$, is filled with charcoal and the second chamber, $k$, with sand, the charcoal disinfecting the water and removing noxious gases therefrom, and the sand as well as the three diaphragms catching mechanical impurities.

The parts being readily separable, the device is easily cleaned, the filtering materials renewed, and the said device may be quickly converted from a strainer to a filter, or vice versa.

The rings or bands may be held in place more securely by a cord, $l$, fastened upon hooks $m$ soldered to the funnel, or other fasteners may be employed for the same purpose, although I prefer the mode of fastening shown, because of its simplicity, effectiveness, and the readiness with which the said cord may be slipped over the rings.

The rings or bands need not necessarily be round.

Having thus described the invention, what I claim as new is—

1. In combination with the funnel, removable and separable rings and diaphragms, a cord, $l$, secured to said funnel, substantially as and for the purposes set forth.

2. In combination, the funnel $a$, having the mouth $b$, the inner ring, $c$, removable from said mouth and extending below the same, a diaphragm, $d$, held in place by said ring, a ring, $f$, having a shoulder, $h$, securing a diaphragm, $e$, over the mouth or end of the downwardly-extending ring $c$, said diaphragm $e$ forming a chamber, $g$, to receive charcoal, and a diaphragm, $i$, secured over the end of the ring $f$, the ring $j$ holding said diaphragm $i$, and said diaphragm $i$ forming a chamber, $k$, for the reception of sand, all substantially as set forth.

In testimony that I claim the foregoing I have hereunto set my hand this 8th day of September, 1884.

FREDERICK HEYL.

Witnesses:
 CHARLES H. PELL,
 F. F. CAMPBELL.